W. A. WOOD.
AUTOMOBILE BLANKET OR ROBE.
APPLICATION FILED DEC. 22, 1919.

1,364,601.

Patented Jan. 4, 1921.

Inventor
William A. Wood.

By Jas. H. Griffin
Attorney

UNITED STATES PATENT OFFICE.

WILLIAM A. WOOD, OF NEW YORK, N. Y., ASSIGNOR TO HOLYOKE PLUSH COMPANY, A CORPORATION OF MAINE.

AUTOMOBILE BLANKET OR ROBE.

1,364,601.

Specification of Letters Patent.

Patented Jan. 4, 1921.

Application filed December 22, 1919. Serial No. 346,745.

*To all whom it may concern:*

Be it known that I, WILLIAM A. WOOD, a citizen of the United States, residing at New York city, borough of Manhattan, county and State of New York, have invented a certain new and useful Automobile Blanket or Robe, of which the following is a specification.

This invention has to do with automobile blankets, robes and the like, hereinafter, for brevity, termed robes, with a view to not only increasing their strength and durability, but, also, incorporating into their structure suitable attaching or locking means, in order to prevent surreptitious removal of the blankets or robes from unoccupied vehicles, when once secured in the desired place, either within the machine or on the radiator.

Automobile blankets, under ordinary conditions of use, last, or should last, from six to eight years. Statistics show, however, that on an average, they must be replaced every two or three years, owing to the fact that they are so frequently stolen. As they are quite valuable, and can be surreptitiously removed from the vehicle so readily, they offer a special temptation to pilferers of automobile attachments and accessories.

Moreover, automobile blankets are commonly used during the winter season to protect the engine radiator against freezing. As the blankets, now in use, do not embody any means for detachably securing them in place over the hoods of the radiators, they are not infrequently blown away and lost. Furthermore, they are subjected to comparatively severe strains when positioned on radiators, due to wind pressure, and accordingly, very often become torn or ripped.

The present invention overcomes the disadvantages referred to, and others, in that it embodies a blanket provided with flexible strengthening elements, whereby the utility of the blanket, for normal use, is not impaired, whereas the life of the blanket, from the standpoints of wear and durability are greatly enhanced. The blanket, moreover, embodies means whereby it may be attached to any convenient part of the machine, to preclude its surreptitious removal, or securely fixed in position over a radiator.

Features of the invention, other than those specified, will be apparent from the hereinafter detailed description taken in conjunction with the accompanying drawings.

In the accompanying drawings, I have illustrated one practical embodiment of the invention, but the construction therein shown is to be understood as illustrative only, and not as defining the limits of the invention.

Figure 1:
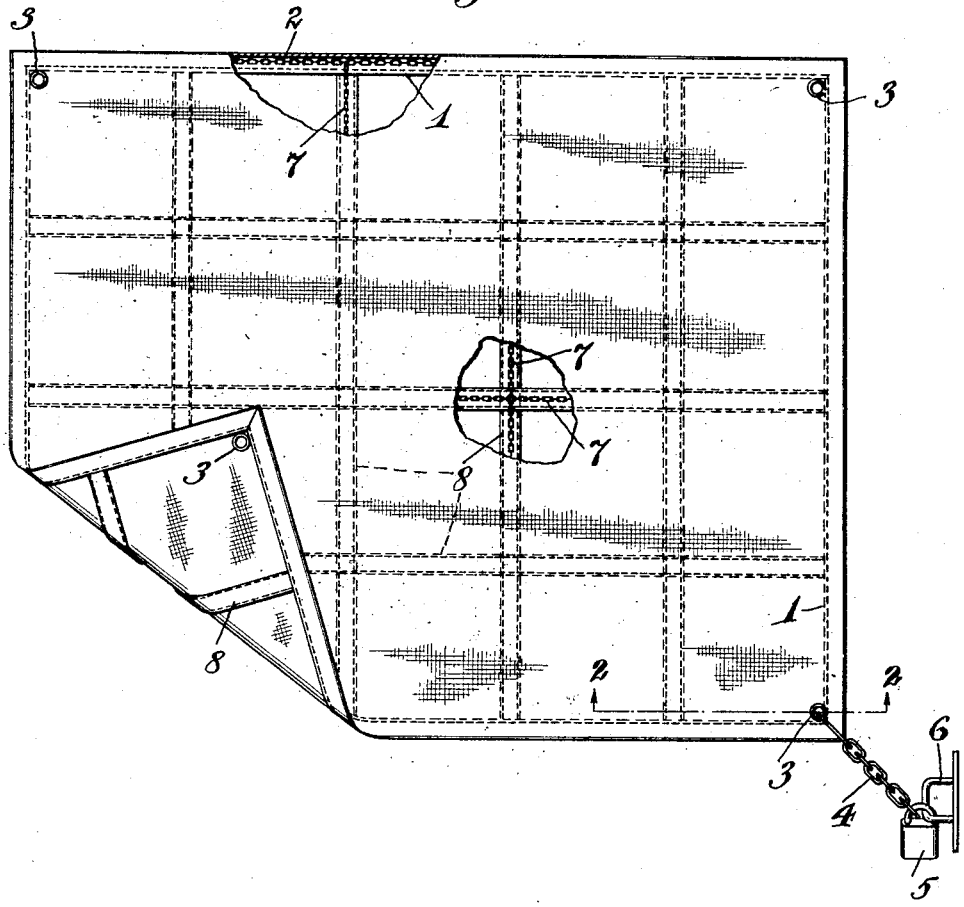
Figure 2:
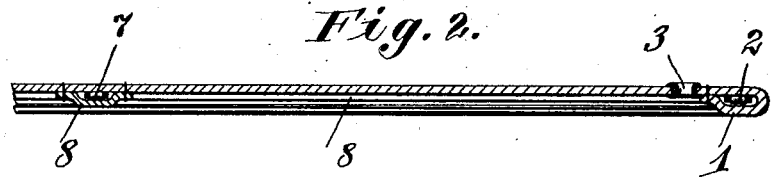

Figure 1 is a face view of a blanket or robe embodying the invention, portions of the robe being broken away in the interest of clearness, and one corner of said robe being turned back so that the under side thereof may be seen; and, Fig. 2 is a section on the line 2—2 of Fig. 1.

The rob or blanket of this invention may be made of any material or shape depending upon the use to which it is intended. In any event, it is hemmed around its outer periphery, as at 1, and within the hem is inclosed a flexible tension member 2. This tension member may be in the form of a flexible cable, wire or other suitable metallic structure, but is shown in the drawings as embodying a chain of the interlocked flat link type commonly used in connection with sash weights.

Some of the advantages of the invention may be realized by employing the chains or cables 2 on two sides only of the blanket: e. g., on the two sides adjacent the locking elements hereinafter described.

The tension member 2 preferably extends continuously around the four sides of the robe and immediately inside of the tension member 2, and preferably at the four corners of the robe are positioned gromets or eyelets 3, although, in practice, only one of said eyelets is required when the robe is to be used as a lap covering. Through any one or more of the eyelets 3, a chain 4 with pad lock 5 may be passed to secure the robe to any convenient part 6 of the car. The construction thus described is preferable, but the robe may, of course, be locked against removal in many ways without departing from the spirit of this invention.

When a robe is locked to a car as shown in Fig. 1, its removal by unauthorized persons is thwarted since the flexible connection 2 is metallic and of such nature that it is practically non-severable by such means as are ordinarily at the disposal of such unauthorized persons, As many automobile robes are made of valuable material, it is probable, however, that a person, so disposed, would, upon finding that he could not remove the entire robe, attempt to cut out the center portion of the robe by slitting it around the inner edge of the hem. The robe thus stolen could be rehemmed and would be practically as good as the original robe. To preclude this practice, I preferably lay across the back of the robe a net work of flexible tension members 7 which extend parallel to the sides and ends of the robe and are secured at their opposite ends to the peripheral tension member 2. This net work of tension members is shown, for the purpose of illustration, in the form of chains similar to chain 2. If the blanket or robe embodies two or more plies, this chain net work may be housed between the plies of the blanket, but, if the blanket is of the single ply type, inclosing straps 8 may be sewed on to the back of the blanket in such manner as to house the chains 7. Moreover, these straps may be ornamental so as to add to the appearance of the blanket rather than to detract from the same. The peripheral chain 2 has been referred to as housed within the hem 1, though, manifestly, it may be secured to the blanket by means of straps similar to the straps 8. By incorporating in the blanket construction a net work of flexible metallic tension members, as described, surreptitious removal of the blanket, or any portion thereof, by unauthorized persons, is precluded.

Accordingly, the present invention precludes the theft of the blanket, but aside from this, the tension members have the further function of relieving the blanket from tensional strains which might ordinarily be imposed thereon during its normal use as a lap robe. It is a common practice, moreover, during the winter season, to cover the radiator of a car with a blanket or robe, to preclude freezing of the radiator and when the blanket constructed as herein described is employed for this purpose, the flexible tension members serve the important function of not only providing means for readily securing the blanket in position but also relieving the blanket from wind strains. In this connection it will appear that the blanket may be as readily locked in place on a radiator as within a car body, although, when used on the radiator it is preferable to securely attach all the corners of the robe. If desired, eyelets or other fastening means may be positioned along the edges of the robe intermediate the corners thereof.

It will be apparent that the specific structure described may be modified in formal respects, such as by the substitution of equivalents, without departing from the spirit or substance of the invention, the scope of which is commensurate with the appended claims.

Having thus fully described the invention, what I claim as new and desire to secure by Letters Patent is:—

1. As a new article of manufacture, an automobile robe provided near its edges, and throughout its body portion, with flexible metal reinforcing and strengthening elements and coöperating means associated therewith, whereby the robe may be locked in place on a vehicle to preclude its surreptitious removal.

2. As a new article of manufacture, an automobile robe provided with a net work of metallic tension and strengthening members for precluding the severing of the robe.

3. As a new article of manufacture, an automobile robe provided with a net work of metallic tension and strengthening members and metallic locking means passing through said net work for securing the robe in position on a car.

4. As a new article of manufacture, an automobile robe provided at two of its edges with a flexible, metal reinforcing and strengthening element, in combination with means, positioned near the juncture of said two edges, whereby the robe may be locked in place on a vehicle to preclude surreptitious removal therefrom.

5. As a new article of manufacture, an automobile robe provided at two of its edges with a flexible, metal reinforcing and strengthening element, in combination with means, coöperating with said element, whereby the robe may be locked in place on a vehicle to preclude its surreptitious removal without mutilating the robe.

In testimony whereof, I have signed my name to this specification.

WILLIAM A. WOOD.